(12) United States Patent
Ohyama

(10) Patent No.: US 10,282,423 B2
(45) Date of Patent: May 7, 2019

(54) ANNOUNCEMENT SYSTEM AND SPEECH-INFORMATION CONVERSION APPARATUS

(71) Applicant: Panasonic Intellectual Property Management Co., Ltd., Osaka (JP)

(72) Inventor: Satoshi Ohyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/818,748

(22) Filed: Nov. 21, 2017

(65) Prior Publication Data

US 2018/0217984 A1 Aug. 2, 2018

Related U.S. Application Data

(63) Continuation of application No. PCT/JP2017/005879, filed on Feb. 17, 2017.

(30) Foreign Application Priority Data

Jan. 30, 2017 (JP) .................................. 2017-014074

(51) Int. Cl.
*G06F 17/28* (2006.01)
*B64D 11/00* (2006.01)
(Continued)

(52) U.S. Cl.
CPC ...... *G06F 17/289* (2013.01); *B64D 11/00151* (2014.12); *G10L 13/00* (2013.01);
(Continued)

(58) Field of Classification Search
CPC .................................................. G06F 17/28
(Continued)

(56) References Cited

U.S. PATENT DOCUMENTS

| 6,154,720 A | 11/2000 | Onishi et al. |
| 7,069,222 B1* | 6/2006 | Borquez ............... G06F 17/289 |
| | | 348/14.07 |

(Continued)

FOREIGN PATENT DOCUMENTS

| JP | 9-062681 | 3/1997 |
| JP | 11-344993 | 12/1999 |

(Continued)

OTHER PUBLICATIONS

International Search Report of PCT application No. PCT/JP2017/005879 dated Apr. 25, 2017.

*Primary Examiner* — Jesse S Pullias
(74) *Attorney, Agent, or Firm* — Wenderoth, Kind & Ponack, L.L.P.

(57) ABSTRACT

An announcement system includes: a sound-pickup apparatus for receiving a speech expressing a fixed-form sentence; a conversion apparatus for generating a translation of the fixed-form sentence based on the speech received; and output apparatus for presenting information indicating the translation. The conversion apparatus includes: a storage unit for storing first-information indicating a predetermined sentence in a mode, and second-information indicating the predetermined sentence in another mode; an audio-input unit for receiving speech-information indicating the fixed-form sentence; speech recognition unit for generating text-information based on the speech-information; conversion processing unit for identifying the first-information corresponding to the fixed-form sentence, based on the text-information and a part of the first-information, before the sound pickup apparatus finishes receiving the speech expressing the whole fixed-form sentence; and transmission unit for transmitting the second-information corresponding to the identified first-
(Continued)

information. The output apparatus presents the received second-information by at least either a video or a speech.

6 Claims, 8 Drawing Sheets

(51) Int. Cl.
    *G10L 15/22*     (2006.01)
    *G10L 15/26*     (2006.01)
    *G10L 13/00*     (2006.01)
    G10L 15/30     (2013.01)
    H04R 27/00     (2006.01)

(52) U.S. Cl.
    CPC ............ *G10L 15/22* (2013.01); *G10L 15/265* (2013.01); *G10L 15/30* (2013.01); *H04R 27/00* (2013.01); *H04R 2499/13* (2013.01)

(58) Field of Classification Search
    USPC ......................................................... 704/2–8
    See application file for complete search history.

(56) References Cited

U.S. PATENT DOCUMENTS

| | | | |
|---|---|---|---|
| 8,077,877 B1 * | 12/2011 | Martin | G06Q 30/02 |
| | | | 379/37 |
| 9,747,282 B1 * | 8/2017 | Baker | G06F 17/289 |
| 2004/0044517 A1 * | 3/2004 | Palmquist | G06F 17/2809 |
| | | | 704/7 |
| 2006/0095249 A1 * | 5/2006 | Kong | G06F 9/454 |
| | | | 704/7 |
| 2008/0077391 A1 | 3/2008 | Chino et al. | |
| 2014/0219461 A1 | 8/2014 | Liu et al. | |
| 2015/0035765 A1 | 2/2015 | Hirabayashi | |
| 2018/0052831 A1 * | 2/2018 | Ahn | G10L 15/26 |
| 2018/0268823 A1 * | 9/2018 | Miura | G06F 9/454 |

FOREIGN PATENT DOCUMENTS

| | | |
|---|---|---|
| JP | 4393494 B | 1/2010 |
| JP | 5813780 B | 11/2015 |

\* cited by examiner

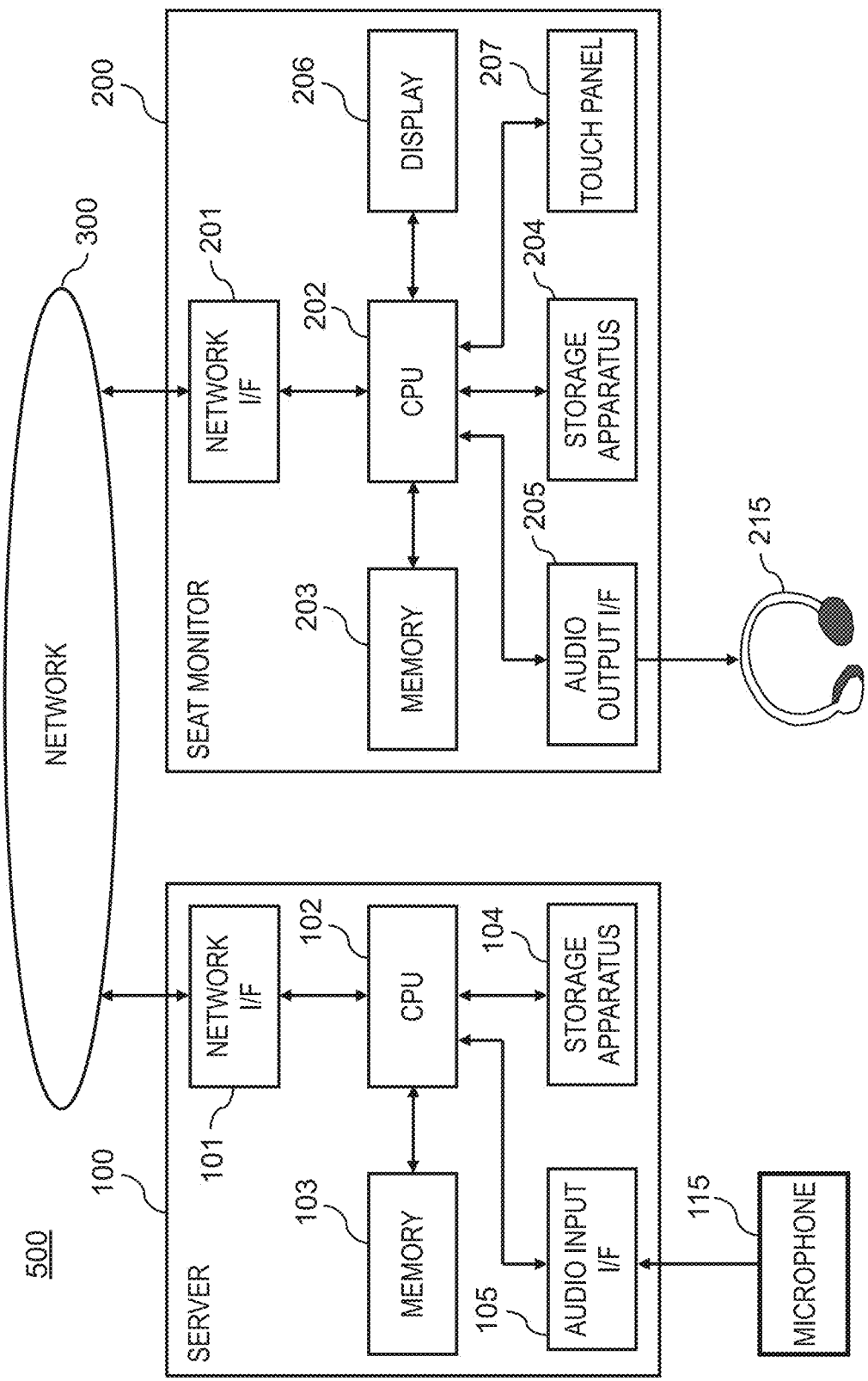

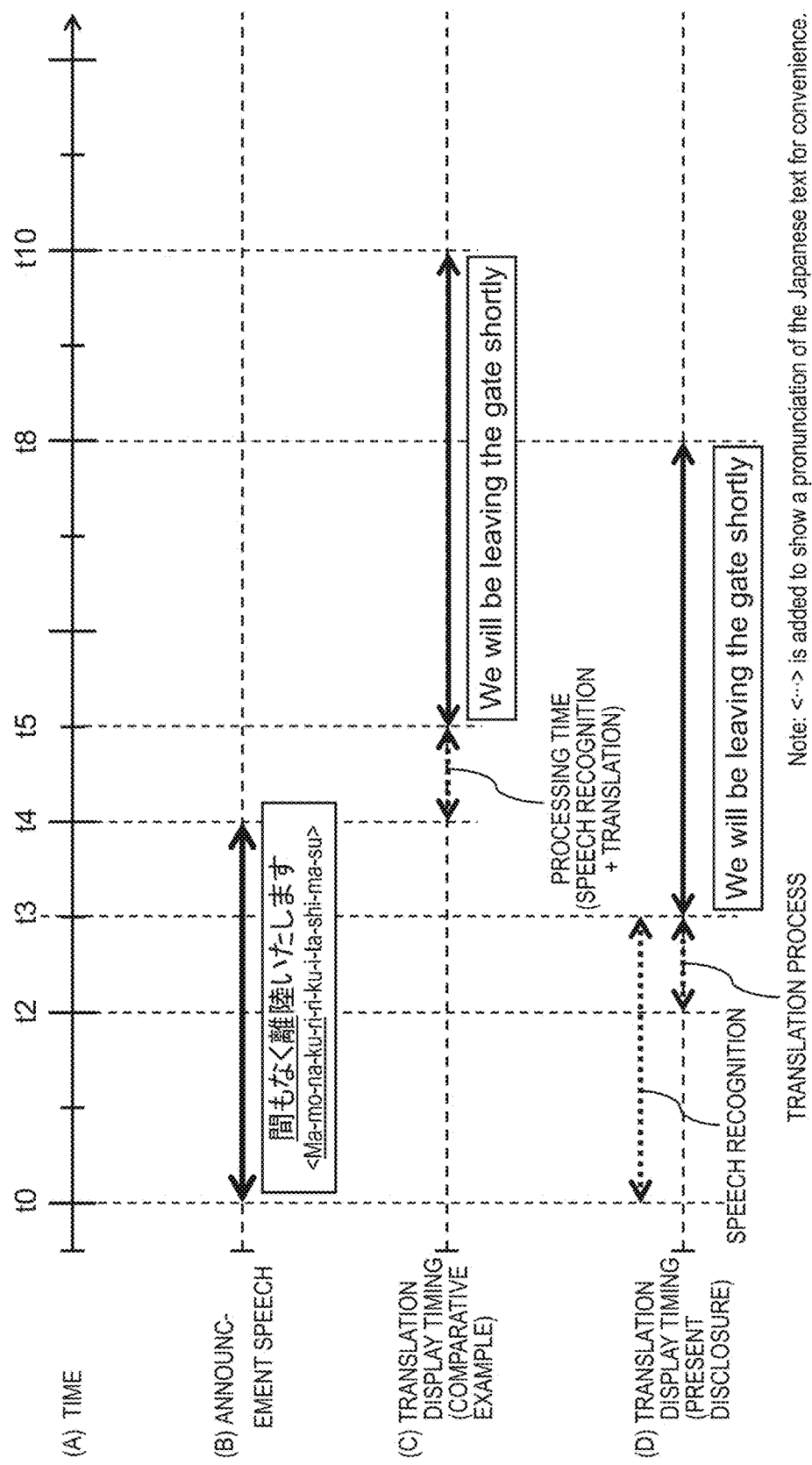

FIG. 4

TEXT CONTROL TABLE 142

| Seq | REGISTERED TEXT (JAPANESE) Note: <--> is added to show a pronunciation of the Japanese text for convenience. | TRANSLATED TEXT (ENGLISH) |
|---|---|---|
| 1 | 間もなく客室乗務員が軽いお食事とお飲物をお配りいたします <Ma-mo-na-ku-kyaku-shitsu-jou-mu-in-ga-karui-o-shoku-ji-to-o-nomi-mono-o-o-kuba-ri-ta-shi-ma-su> | In a few minutes, the flight attendants will be passing through to offer you a beverage of your choice, as well as a light meal |
| 2 | 間もなく離陸いたします <Ma-mo-na-ku-ri-ri-ku-i-ta-shi-ma-su> | We will be leaving the gate shortly |
| 3 | 飛行機の降下に備えましてシートベルト着用のサインが点灯いたしました <Hi-kou-ki-no-ko-ka-ni-so-na-e-ma-shi-te-shi-i-to-be-ru-to-chaku-you-no-sa-i-n-ga-ten-tou-i-ta-shi-ma-shi-ta> | The captain has turned on the fasten seatbelt sign in preparation for our descent. |
| 4 | 飛行機をお降りの際は、お忘れ物がないようにご注意ください <Hi-kou-ki-o-o-ri-no-sai-wa-o-wasu-re-mono-ga-na-i-yo-u-ni-go-chuu-i-ku-da-sa-i> | When leaving the aircraft, please remember to take all your personal belongings with you. |
| 5 | 皆様ただいまシートベルト着用のサインが消えました <Mina-sama-ta-da-i-ma-shi-i-to-be-ru-to-chaku-you-no-sa-i-n-ga-ki-e-ma-shi-ta> | Ladies and gentlemen, the seatbelt sign has just been turned off |
| 6 | 皆様ただいまシートベルト着用のサインが点灯いたしました <Mina-sama-ta-da-i-ma-shi-i-to-be-ru-to-chaku-you-no-sa-i-n-ga-ten-tou-i-ta-shi-ma-shi-ta> | Ladies and gentlemen, the seatbelt sign has just been turned on |
| | ... | ... |

FIG. 8

| DETERMINATION NUMBER-OF-CHARACTERS TABLE | | | | | |
|---|---|---|---|---|---|
| DETERMINATION NUMBER-OF-CHARACTERS | 5 | 10 | 17 | 20 | ... |

144

ANNOUNCEMENT SYSTEM AND SPEECH-INFORMATION CONVERSION APPARATUS

BACKGROUND

Technical Field

The present invention relates to speech-information conversion apparatuses for outputting information corresponding to contents of utterances that are inputted, in situations where such contents have been determined in advance (for example, such apparatuses include an announcement system that translates announcements expressing fixed-form sentences and outputs the resulting translations).

Description of the Related Art

Patent Literature 1 discloses a machine translation apparatus which can provide translations with improved accuracy. The machine translation apparatus according to the Patent Literature 1 includes: an example storing means, a receiving means, a first recognizing means, a second recognizing means, a calculating means, and an example translating means. The example storing means that stores, in the means, both source language examples and target language examples that have been translated from the source language examples, with each of the latter examples being associated with the corresponding one of the former examples. The receiving means receives an input of a speech that is uttered in the source language. The first recognizing means recognizes the received uttered-speech as an appropriate character string in the source language. The second recognizing means recognizes the received uttered-speech as a source language example which is selected from among the source language examples stored in the example storing means, with thus-selected source language example most likely matching the received uttered-speech. The calculating means calculates a similarity between the result of first recognition of the uttered-speech and the result of second recognition of the uttered-speech; the first recognition is made by the first recognizing means while the second recognition is made by the second recognizing means. The example translating means retrieves, from the example storing means, the target language example corresponding to the result of the second recognition when the thus-calculated similarity is larger than a predetermined first threshold value, thereby translating the uttered-speech. With this configuration, when translating the utterance contents of a speech, it is possible to refer to the multiple results of recognition processing, allowing an improvement in translation accuracy in machine translations.

CITATION LIST

Patent Literature

PTL 1: Japanese Patent No. 4393494

SUMMARY

In accordance with a first aspect of the present disclosure, an announcement system converts an announcement uttered in one language into another language. The announcement system includes: a sound pickup apparatus for receiving a speech expressing a fixed-form sentence; a conversion apparatus for generating a translation of the fixed-form sentence based on the speech received by the sound pickup apparatus; an output apparatus for presenting information indicating the translation. The conversion apparatus includes: a storage unit, an audio input unit, a speech recognition unit, a conversion processing unit, and a transmission unit. The storage unit stores first information that indicates a content of a predetermined sentence in a mode, and second information that indicates the content of the predetermined sentence in another mode different from the mode. The audio input unit receives, from the sound pickup apparatus, speech information indicating the fixed-form sentence. The speech recognition unit generates text information based on the speech information. The conversion processing unit identifies the first information corresponding to the fixed-form sentence, based on both the text information and a part of the first information, before the sound pickup apparatus finishes receiving the speech expressing a whole of the fixed-form sentence. The transmission unit transmits the second information corresponding to the identified first information. The output apparatus receives the second information transmitted from the transmission unit of the conversion apparatus, and presents the received second information by at least either a video or a speech.

In accordance with a second aspect of the present disclosure, a speech-information conversion apparatus converts a fixed-form sentence inputted by a speech into another piece of information. The speech-information conversion apparatus includes: a storage unit, an audio input unit, a speech recognition unit, a conversion processing unit, and an output unit. The storage unit stores first information that indicates a content of a predetermined sentence in a mode, and second information that indicates the content of the predetermined sentence in another mode different from the mode. The audio input unit receives speech information indicating the fixed-form sentence. The speech recognition unit generates text information based on the speech information. The conversion processing unit identifies the first information corresponding to the fixed-form sentence, based on both the text information and a part of the first information, before completion of receiving the speech information indicating a whole of the fixed-form sentence. The output unit outputs the second information corresponding to the identified first information.

BRIEF DESCRIPTION OF DRAWINGS

FIG. 2 is a block diagram illustrating an internal configuration of the in-flight announcement system.

FIG. 3 is a timeline chart for illustrating problems and advantageous effects of the in-flight announcement system.

FIG. 4 is a view of an example of a configuration of a text control table.

FIG. 8 is a view illustrating an example of a configuration of a determination number-of-characters table.

DETAILED DESCRIPTION

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the inventor provides the accompanying drawings and the following descriptions so as to facilitate fully understanding of the present disclosure by those skilled in the art, and have no intention of imposing any limitation on the subject matter set forth in the appended claims.

First Exemplary Embodiment 1-1. Configuration

Figure 1:
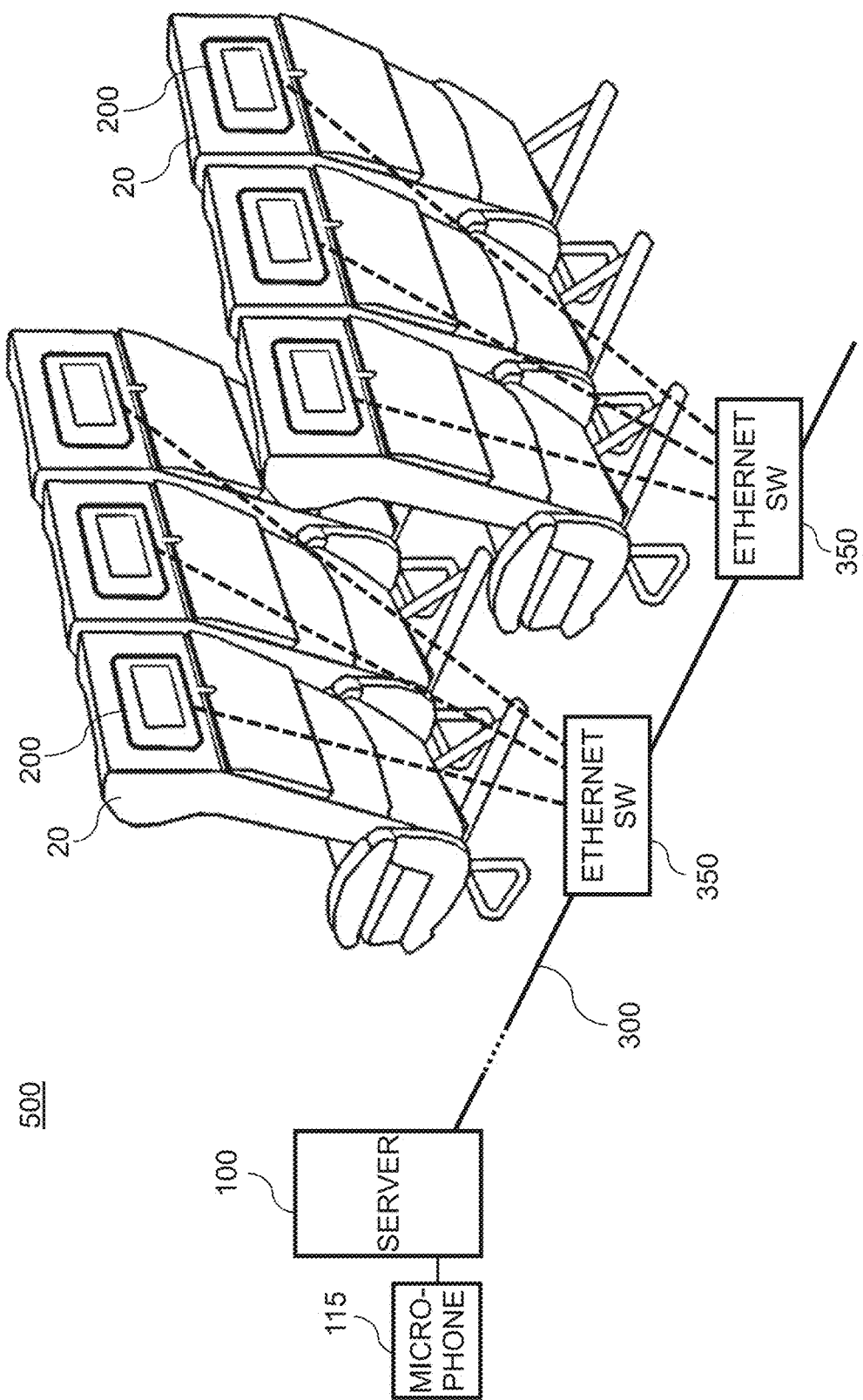
FIG. 1 is a view of a configuration of an in-flight announcement system according to an embodiment of the present disclosure.

FIG. 1 is a view of a configuration of an in-flight announcement system according to an embodiment of the present disclosure. In-flight announcement system 500 is a system that converts an announcement (a fixed-form sentence), which are uttered by a flight attendant in the cabin of an aircraft, into announcements in various languages, and then presents aircraft's passengers with the resulting announcement in various languages. Note that, for convenience, the following descriptions will be made by using a case where the in-flight announcement system is configured to translate announcements uttered in Japanese into English.

As shown in FIG. 1, in-flight announcement system 500 includes: server 100 for translating an in-flight announcement, and seat monitors 200 for displaying the translated sentence of the announcement, with the seat monitors being disposed in seats 20, one for each seat. Server 100 and seat monitors 200 are connected to network 300, i.e. Ethernet (registered trademark). Each of seat monitors 200 is particularly connected to network 300 via Ethernet switch 350 serving as a switching hub.

FIG. 2 is a block diagram illustrating an internal configuration of in-flight announcement system 500. As shown in FIG. 2, server 100 includes: a central processing unit (CPU) 102 for controlling the total operation of the server; memory 103 for serving as a work space for CPU 102; and storage apparatus 104 for recording control data, programs, and the like.

Storage apparatus 104 is a record medium to record parameters, data, and programs, which are necessary to carry out functions of server 100; the apparatus may be configured with a hard disk drive (HDD), solid state drive (SSD), optical disk drive, or the like, for example. Storage apparatus 104 stores a control program therein for carrying out the functions of server 100 to be described later. The control program may be provided via either a network or a record medium such as a digital versatile disk-read only memory (DVD-ROM).

Memory 103 functions as a work space for CPU 102, being a memory element for temporally storing data therein. The memory may be configured with various types of semiconductor memories.

CPU 102 executes the control program stored in storage apparatus 104, thereby carrying out a predetermined function.

Server 100 further includes: network interface 101 for coupling the server to network 300, and audio input interface 105 for receiving audio signals.

Audio input interface 105 is coupled with microphone 115 for converting a sound into an audio signal. The audio input interface is a circuit for receiving the audio signal fed from microphone 115. Network interface 101 is a communication module compliant with the IEEE 802.11 standard or the like, for performing wired or wireless data communications.

On the other hand, seat monitor 200 includes: CPU 202 for controlling the whole operation of the seat monitor; memory 203 serving as a work space for CPU 202; and storage apparatus 204 for recording control data, programs, and the like.

Storage apparatus 204 is a record medium to record parameters, data, and programs which are necessary to carry out functions of seat monitor 200. The storage apparatus may be configured with a hard disk drive (HDD), solid state drive (SSD), optical disk drive, or the like, for example. Storage apparatus 104 stores a control program therein for carrying out the functions of server 100 to be described later. The control program may be provided via either a network or a record medium such as a DVD-ROM.

Memory 203 functions as a work space for CPU 202, being a memory element for temporally storing data therein. The memory may be configured with various types of semiconductor memories.

CPU 202 executes the control program stored in storage apparatus 204, thereby carrying out a predetermined function.

Seat monitor 200 further includes: display 206 for displaying images and texts, and touch panel 207 to be operated by a user. Display 206 is configured with a liquid crystal display device, an organic electroluminescent (EL) device, or the like. Touch panel 207 is disposed to be superimposed upon display 206. Touch panel 207 is an input apparatus capable of receiving an input via a touch operation (gestural operation) that is performed by the user. Among adopted types of touch panel 207 may be various types of panels (a capacitance type panel, resistance-film type panel, infrared type pane panel, and the like).

Seat monitor 200 further includes: network interface 201, and audio output interface 205 which outputs audio signals. Audio output interface 205 outputs the audio signals to an audio-output apparatus such as headphones 215 or a speaker. Network interface 201 is a communication module compliant with the IEEE 802.11 standard or the like, for performing wired or wireless data communications.

1-2. Operation

Operations of in-flight announcement system 500 configured as described above will be described hereinafter.

FIG. 3 is a timeline chart for illustrating problems of in-flight announcement system 500 according to the embodiment. The description starts by showing the problems which the present disclosure is intended to solve, with reference to FIG. 3.

After an in-flight announcement has been uttered by a flight attendant, the uttered announcement is subjected to a translation process (conversion process). Then, after the translation process has been finished, contents of the translated announcement are output. For example, as shown in (B) of FIG. 3, assume a case in which an in-flight announcement in Japanese pronounced "Ma-mo-na-ku-ri-ri-ku-i-ta-shi-ma-su" starts at time "t0" and ends at time "t4." In this case, in accordance with conventional translation processes, as shown in (C) of FIG. 3, the translation process is started after the announcement in Japanese pronounced "Ma-mona-ku-ri-ri-ku-i-ta-shi-ma-su" has ended (that is, the translation process is started at time "t4"). After that, at time "t5" when the translation process is finished, the resulting translated announcement in English is output (by either a display or a speech), saying, "We will be leaving the gate shortly." In this way, in accordance with conventional translation processes, the translation process is performed after the contents of the utterance have been determined, and then the resulting translation is output after the translation process has been finished. For this reason, there has been a problem that it takes long before the translation result is output after the utterance is started. In-flight announcement system 500 according to the embodiment is intended to solve such a problem.

As shown in (D) of FIG. 3, in-flight announcement system 500 starts performing the translation process for the in-flight announcement at a point in time (time "t2") during the utterance of the announcement, then determines a translated sentence. This operation makes it possible for the system to output the resulting translation at an earlier time (at time "t3" in the case of FIG. 3) after the utterance is started.

More specifically, in-flight announcement system 500 has registered, in advance, both first-language (Japanese) texts expressing the contents of announcements that will probably be uttered by flight attendants, and second-language (English) texts that are translated sentences corresponding to the thus-registered first-language texts. Then, in accordance with the contents of an announcement that is being uttered, the system identifies one text from among a plurality of the first-language texts having been registered, and then retrieves the translated sentence (i.e. second-language text) corresponding to the thus-identified text.

With this configuration, as shown in FIG. 4, in-flight announcement system 500 holds text control table 142 in which registered texts, i.e. original Japanese texts, are associated with translated texts, i.e. English sentences translated from the registered texts. Text control table 142 is stored in storage apparatus 104 of server 100.

Text control table 142 controls the texts in such a manner that, for example, a Japanese registered text pronounced "Ma-mo-na-ku-kyaku-shitsu jou-mu-in-ga-karu-i-o-shoku-ji-to-o-nomi-mono-o-o-kuba-ri-i-ta-shi-ma-su" is associated with an English translated text saying, "In a few minutes, the flight attendants will be passing through to offer you a beverage of your choice, as well as a light meal," which has been translated from the registered text. Server 100 (CPU 102) refers to text control table 142, thereby being able to use a Japanese text to acquire an English text that corresponds to the Japanese text. Here, the registered texts contained in text control table 142 are fixed-form sentences that are expected to be uttered frequently in in-flight announcements.

Figure 5:
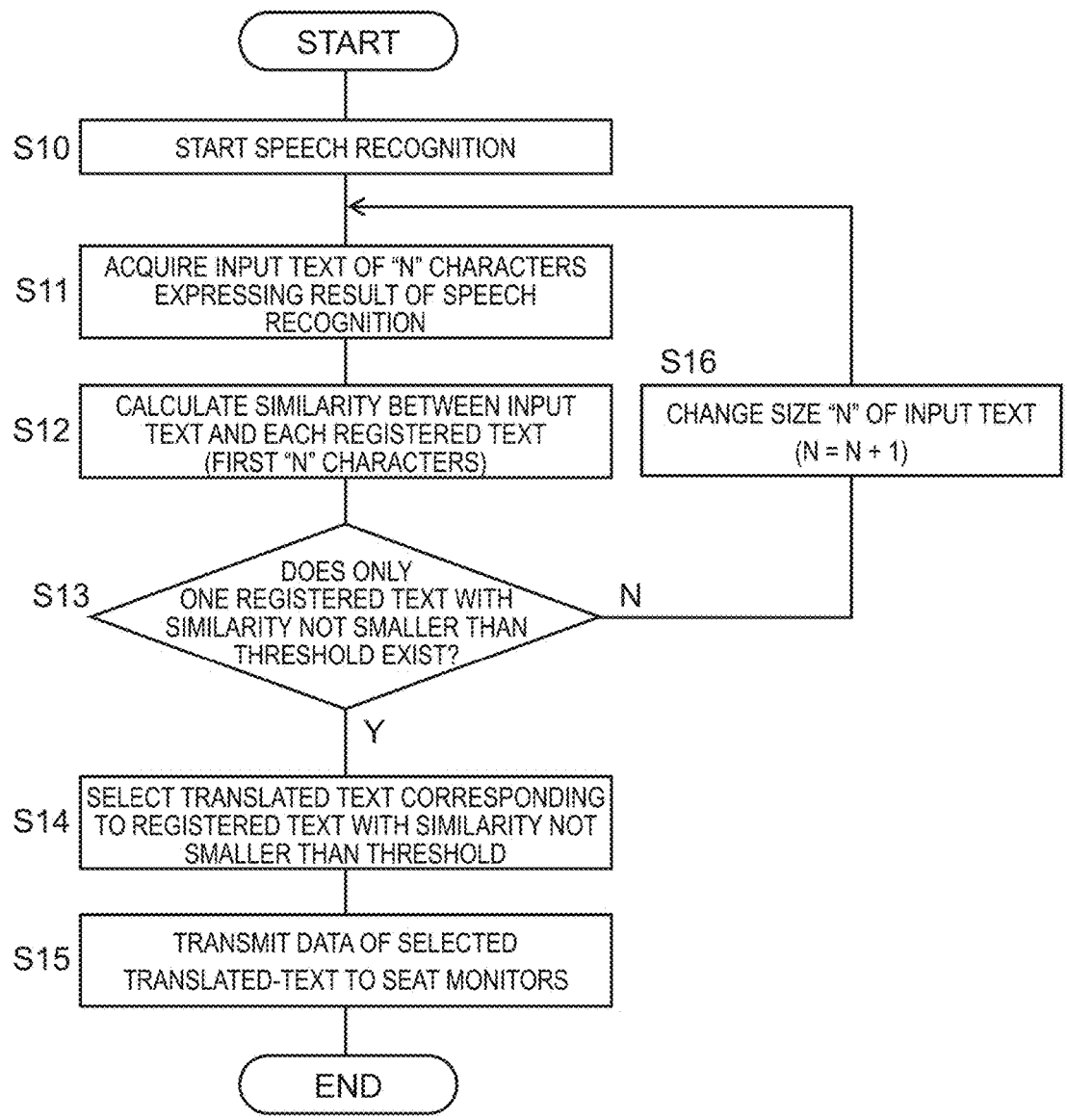
FIG. 5 is a flowchart illustrating a translation process (conversion process) that is performed by the in-flight announcement system according to a first embodiment.

FIG. 5 is a flowchart illustrating a translation process that is performed by in-flight announcement system 500. With reference to the flowchart shown in FIG. 5, the translation process performed by in-flight announcement system 500 is described. This process is executed mainly with CPU 102 of server 100.

When a flight attendant starts making an in-flight announcement, microphone 115 starts receiving the speech of the flight attendant and converts it into an audio signal. The audio signal converted by microphone 115 is inputted to server 100 via audio input interface 105. Based on the thus-inputted audio signal, CPU 102 of server 100 starts performing speech recognition (S10). CPU 102 produces text data resulting from the speech recognition on a time-series basis, and stores the thus-produced text data sequentially in memory 103.

CPU 102 reads the text data, from memory 103, which have been stored there as the result of the speech recognition (S11). In this case, CPU 102 reads, from memory 103, text data that consist of "N" characters counted from the beginning of the text. Here, "N" represents the size of the text data that are acquired as the result of the speech recognition, and is a variable value. In the embodiment, "N" starts with an initial value of 1 (one) and is raised in increments of 1 (one).

Referring to text control table 142, CPU 102 calculates a similarity between the text (referred to as the "input text," hereinafter) indicated by the thus-read text data and (a part of) each of the registered texts (S12). That is, CPU 102 calculates the similarity between the input text consisting of "N" characters and the part of each of the registered texts, with the part having the same text-data size as the input text (that is, the part consisting of only "N" characters counted from the beginning of the registered text).

For example, a case is described where the input text read from memory 103 is a text pronounced "Hi-kou-ki-no" (four characters in Japanese). In this case, CPU 102 calculates the similarity between the Japanese four-characters string pronounced "Hi-kou-ki-no" of the input text and a Japanese first-four-characters string of each of the registered texts at text control table 142 (for example, such Japanese first-four-characters strings are ones pronounced "Ma-mo-na-ku," "Hi-kou-ki-no," "Hi-kou-ki-o," "Mina-sama-ta-da," and so on).

More specifically, CPU 102 starts by calculating the similarity between "Hi-kou-ki-no" of the input text and "Ma-mo-na-ku" consisting of first four characters of the first one of the registered texts. Next, CPU 102 calculates the similarity between "Hi-kou-ki-no" of the input text and "Ma-mo-na-ku" consisting of first four characters of the second one of the registered texts. Then, CPU 102 calculates the similarity between "Hi-kou-ki-no" of the input text and "Hi-kou-ki-no" consisting of first four characters of the third one of the registered texts. Then, CPU 102 calculates the similarity between "Hi-kou-ki-no" of the input text and "Hi-kou-ki-o" consisting of first four characters of the fourth one of the registered texts. In this way, CPU 102 calculates the similarity between the input text and each of all the registered texts that have been registered at text control table 142.

Referring now back to FIG. 5, the description continues. After the similarities have been calculated between the input text and all the registered texts (S12), CPU 102 determines whether there exists only one registered text that shows the similarity being not smaller than a threshold value (S13).

When it is determined that there exists only one registered text with the similarity not smaller than the threshold value, this registered text is identified as one that corresponds to the in-flight announcement being uttered. The registered texts under the control by text control table 142 are fixed-form sentences that will be uttered as in-flight announcements. Therefore, even before the utterance of an in-flight announcement comes to an end, it is possible to identify the registered text that corresponds to the announcement being uttered, based on a part of the announcement being uttered.

When it is determined that there exists only one registered text with the similarity not smaller than the threshold value (YES in S13), CPU 102 refers to text control table 142, thereby selecting the translated text that corresponds to the only one registered text (S14). For example, in the case shown in FIG. 4, when there exists only third registered text as a registered text that shows a similarity not smaller than the threshold value to the input text (pronounced "Hi-kou-ki-no"), the translated text corresponding to the third translated text is selected (the thus-selected text is one saying, "The captain has turned on the fasten seatbelt sigh in preparation for our descent").

After the translated text has been selected, CPU 102 transmits data indicating the thus-selected translated text to seat monitors 200 via network 300 (S15). Each of seat monitors 200 receives the data indicating the translated text, from server 100 via network interface 201. CPU 202 of seat monitor 200 causes display 206 to display the text indicated by the thus-received data. For example, in seat monitor 200, display 206 displays the text saying, "The captain has turned on the fasten seatbelt sigh in preparation for our descent." With this configuration, a user can confirm, on display 206, an English translation of the in-flight announcement. Note that, in addition to or instead of the display of the translated text on display 206, seat monitor 200 may output a speech saying the translated text, with an audio-output apparatus such as headphones 215.

On the other hand, when it is determined that there exists zero or a plurality of registered texts with the similarities not smaller than the threshold value (NO in S13), CPU 102 increments size "N" of the input text by 1 (one) (S16), and then newly acquires the input text consisting of "N" characters from memory 103 (S11). Then, CPU 102 calculates the similarity between the newly-acquired input text and each of the registered texts (S12). Then, the CPU determines whether there exists only one registered text that shows the similarity being not smaller than the threshold value (S13). In this way, in accordance with in-flight announcement system 500, the similarities between the input text and the registered texts are repeatedly determined, with the size of the input text being incremented by one character every time, until it will be determined that there exists only one registered text that shows the similarity being not smaller than the threshold value.

As described above, in accordance with in-flight announcement system 500 according to the embodiment, at a point in time when it is determined that a part of the in-flight announcement is similar to a registered text, the translated sentence corresponding to the in-flight announcement is selected and displayed on seat monitor 200. In this way, the translated sentence can be determined before the utterance of the whole of the text of the in-flight announcement comes to an end, which allows the translated sentence to be more quickly presented to passengers.

For example, a case is described where the announcement in Japanese pronounced "Ma-mo-na-ku-ri-ri-ku-i-ta-shi-ma-su" is started at time "t0." In this case, conventionally, as shown in (C) of FIG. 3, the translation process is started at time "t4" after the announcement has ended. In contrast, in accordance with the embodiment, as shown in (D) of FIG. 3, the selection of the translated text is started at a point in time during the utterance of the in-flight announcement; the point in time indicates the timing (approximately at time "t2") in which a speech recognition of "Ma-mo-na-ku-ri" is achieved. For this reason, it is possible to present the resulting translation to passengers at an earlier time (time "t3").

1-3. Advantageous Effects and Others

As described above, in-flight announcement system 500 according to the embodiment is an announcement system that converts (translates) an announcement uttered in one language (e.g. Japanese) into another language (e.g. English). In-flight announcement system 500 includes: microphone 115 (an example of a sound pickup apparatus) for receiving a speech that expresses a fixed-form sentence; server 100 (an example of a conversion apparatus) for generating a translation of the fixed-form sentence in accordance with the speech received by microphone 115; and seat monitor 200 (an example of an output apparatus) for presenting information that indicates the resulting translation.

Server 100 includes: storage apparatus 104 (an example of a storage unit); audio input interface 105 (an example of an audio input unit); CPU 102 (an example of a speech recognition unit); CPU 102 (an example of a conversion processing unit); and network interface 101 (an example of a transmission unit). The storage apparatus stores the registered texts (an example of first information) that express contents of predetermined sentences, and the translated texts (an example of second information) that express the contents of the predetermined sentences in another language (an example of a different mode) which differs from that of the registered texts. The audio input interface receives, from microphone 115, speech information that indicates an announcement (an example of the fixed-form sentence). The CPU, the example of the speech recognition unit, generates an input text (an example of text information) based on the speech information. The CPU, the example of the conversion processing unit, identifies the registered text corresponding to the announcement, based on the input text and a part of the registered text, before microphone 115 finishes receiving the speech uttering the whole of the text of the announcement. The network interface transmits, to seat monitors 200, the translated text corresponding to the thus-identified registered text. Each of seat monitors 200 presents the information, by a video and/or a speech, which indicates the translated text received from server 100.

In accordance with the configuration described above, before microphone 115 finishes receiving the speech uttering the whole of the text of a fixed-form sentence, the registered text corresponding to the fixed-form sentence is identified based on the input text and a part of the registered text. This makes it possible to display the resulting translated sentence even during the utterance of the announcement (fixed-form sentence). That is, it is possible to present the translated sentence to passengers quickly after the announcement is started, which helps the passengers understand the contents of the announcement.

In in-flight announcement system 500, the registered texts are expressed in Japanese (an example of the first language) while the translated texts (second information) are expressed in English (an example of the second language). With this configuration, a Japanese announcement can be translated into English.

Moreover, CPU 102 identifies the registered text corresponding to the announcement, based on the similarity between the input text that has been generated via the speech recognition and a part of the registered text (S13). Use of the similarity between these texts, as the base for determination, allows the CPU to accurately identify the registered text corresponding to the uttered announcement.

Second Exemplary Embodiment

Descriptions will be made regarding another configuration of the translation process performed by in-flight announcement system 500 (CPU 102 of server 100) according to the present disclosure. In this embodiment, the hardware configuration of in-flight announcement system 500 is the same as that in the first embodiment. Only the process executed with CPU 102 of server 100 is different from that of the first embodiment.

Figure 6:
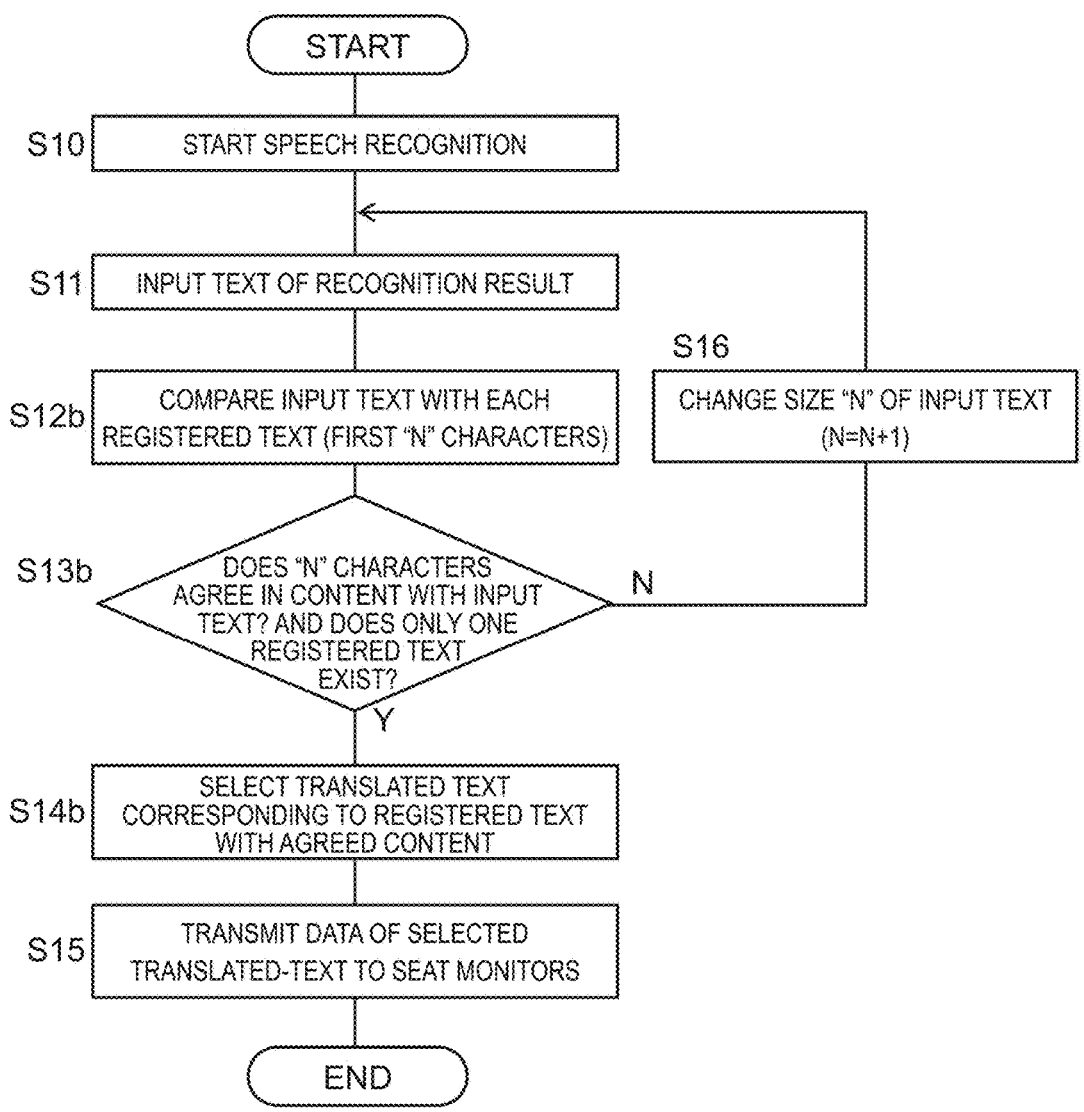
FIG. 6 is a flowchart illustrating a translation process (conversion process) that is performed by the in-flight announcement system according to a second embodiment.

FIG. 6 is a flowchart illustrating the process that is executed with CPU 102 of server 100 of in-flight announcement system 500 according to the second embodiment. Hereinafter, with reference to the flowchart shown in FIG. 6, the translation process is described which is performed by in-flight announcement system 500 (CPU 102 of server 100) according to the embodiment.

As in the case of the first embodiment, when a flight attendant starts making an in-flight announcement, speech recognition is started (S10). Data resulted from the speech recognition are sequentially stored in memory 103, on a time-series basis.

CPU 102 reads, from memory 103, text data that consist of only "N" characters (the initial value of "N" is one) counted from the beginning of the text, with the text data having been stored there as the result of the speech recognition (S11).

Referring to text control table 142, CPU 102 compares the input text with each of the registered texts. That is, the input text consisting of the "N" characters is compared with "N" characters counted from the beginning of each of the registered texts (S12*b*).

After that, CPU 102 determines whether there exists only one registered text consisting of the "N" characters which agrees in content with the input text consisting of the "N" characters (S13*b*).

When it is determined that there exists only one registered text consisting of the "N" characters which agrees in content with the input text consisting of the "N" characters (YES in S13*b*), CPU 102 refers to text control table 142, thereby selecting the translated text corresponding to the registered text that satisfies the conditions for the above determination (S14*b*).

CPU 102 transmits data indicating the thus-selected translated text to seat monitors 200 via network 300 (S15). Each of seat monitor 200 causes display 206 to display the text indicated by the received data.

On the other hand, when it is determined that there exists either zero or not smaller than two registered texts each of which consists of the "N" characters and agrees in content with the input text consisting of the "N" characters (NO in S13*b*), CPU 102 increments size "N" of the input text by 1 (one) (S16). Then, the CPU newly acquires the input text consisting of "N" characters from memory 103 (S11), and calculates the similarity between the newly-acquired input text and each of all the registered texts (S12*b*). Then, CPU 102 determines whether there exists only one registered text consisting of the "N" characters which agrees in content with the input text consisting of the "N" characters (S13*b*). Subsequently, CPU 102 repeats the above processes (S11 to S13*b*, and S16), with the size of the input text being incremented by one character every time, until only one registered text will be found which partially agrees in content with the input text.

In accordance with in-flight announcement system 500 according to the embodiment, when a part of the in-flight announcement agrees with a part of the registered text, the translated sentence corresponding to the in-flight announcement is selected and displayed on seat monitor 200. In this way, the translated sentence is determined before the utterance of the whole of the text of the in-flight announcement comes to an end, which allows the translated sentence to be more quickly presented to passengers.

Third Exemplary Embodiment

Descriptions will be made regarding further another configuration of the translation process performed by in-flight announcement system 500 (CPU 102 of server 100) according to the present disclosure. In this embodiment, the hardware configuration of in-flight announcement system 500 is the same as that in the first embodiment. Only the process executed with CPU 102 of server 100 is different from that in the first embodiment.

Figure 7:
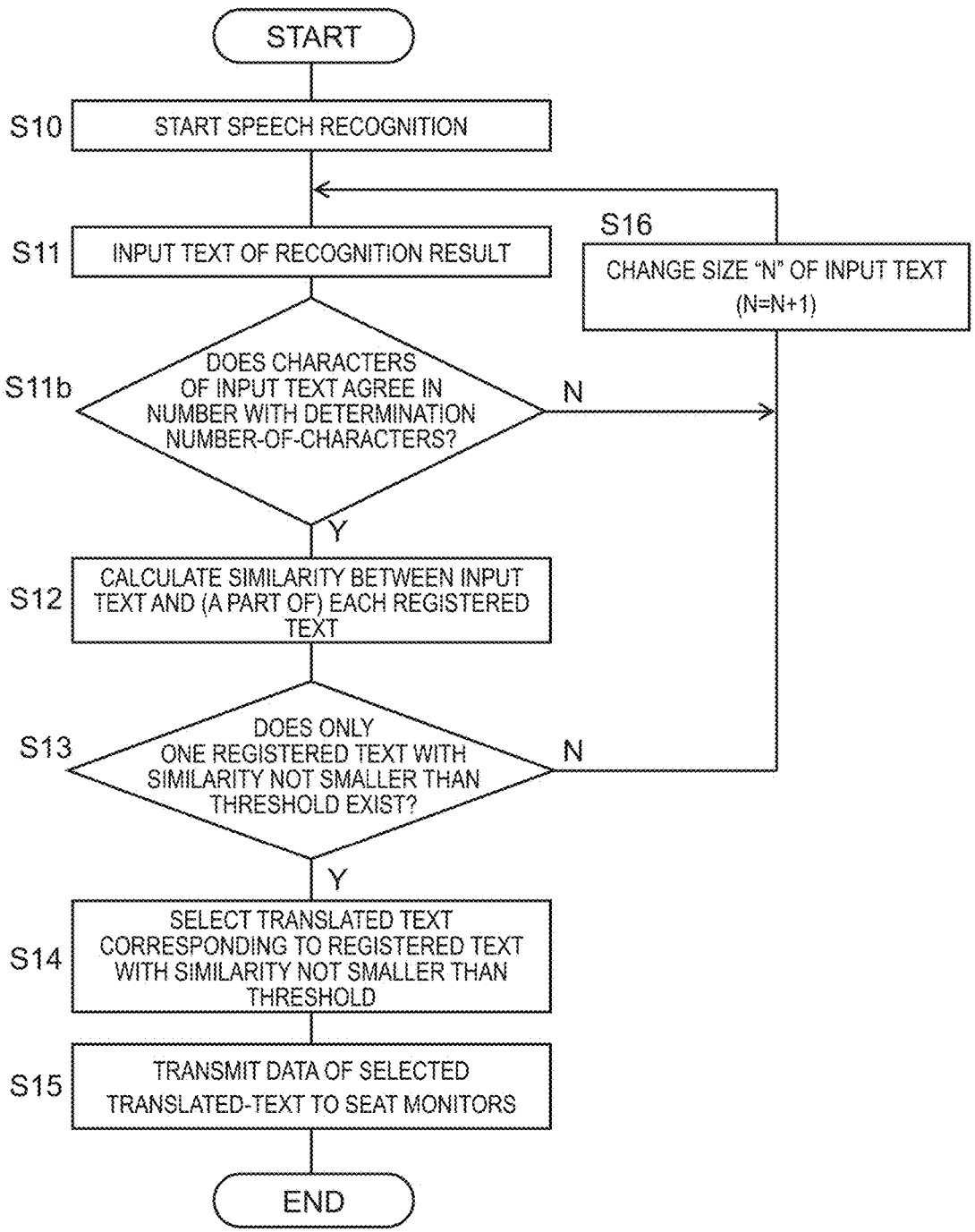
FIG. 7 is a flowchart illustrating a translation process (conversion process) that is performed by the in-flight announcement system according to a third embodiment.

FIG. 7 is a flowchart illustrating a translation process that is executed with CPU 102 of server 100 of in-flight announcement system 500 according to the third embodiment. The flowchart according to the embodiment is configured such that Step S11*b* is added to the flowchart (see FIG. 5) according to the first embodiment. FIG. 8 is a view illustrating an example of a configuration of a determination number-of-characters table (an example of control information) that is used in the translation process according to the embodiment.

A plurality of the registered texts which is registered at text control table 142 shown in FIG. 4 is such that any one of the registered texts can be identified by referring the character string consisting of predetermined-number characters counted from the beginning of each of the registered texts. That is, determining what the character string underlined in FIG. 4 is makes it possible to identify each of the registered texts. For example, if each of the registered texts is determined as to what the character string consisting of the first three characters of the text is (for example, such a three-characters string in Japanese is one pronounced "Ma-mo-na," "Hi-kou-ki," or "Mina-sama-ta"), it is unable to identify corresponding one registered text from among the registered texts. However, if each of the registered texts is determined as to what the character string consisting of the first four characters (e.g. "hi-kou-ki-no" or "hi-kou-ki-o") of the text is, it is possible to identify corresponding one of the third and fourth registered texts from among the registered texts. Moreover, if each of the registered texts is determined as to what the character string consisting of the first five characters (e.g. "Ma-mo-na-ku-kyaku" or "Ma-mo-na-ku-ri") of the text is, it is possible to identify corresponding one of the first and second registered texts from among the registered texts. Furthermore, if each of the registered texts is determined as to what the character string consisting of the first twenty characters (e.g. "Mina-sama- . . . -ki" or "Mina-sama- . . . -ten") of the text is, it is possible to identify corresponding one of the fifth and sixth registered texts from among the registered texts. In this way, if each of the registered texts is determined as to what the character string consisting of the first predetermined-number characters of the text is, it is possible to identify corresponding one registered text from among the registered texts. In the embodiment, the number of characters (referred to as "determination number-of-characters," hereinafter) is controlled by means of determination number-of-characters table 144, with the determination number-of-characters indicating the number of characters that are necessary for identifying the corresponding registered text from among the registered texts registered at text control table 142 shown in FIG. 8. Determination number-of-characters table 144 is stored in storage apparatus 104 of server 100.

Hereinafter, a description is made regarding the translation process performed by in-flight announcement system 500 (CPU 102 of server 100) according to the embodiment, with reference to the flowchart shown in FIG. 7.

When a flight attendant starts making an in-flight announcement, CPU 102 of server 100 receives an audio signal and starts performing speech recognition based on the signal (S10). Text data that indicate the result of the speech recognition are sequentially stored in memory 103.

CPU 102 reads, from memory 103, the first "N" characters from the beginning of the text data (input text) which have been stored as the result of the speech recognition (S11).

CPU 102 determines whether the number of the thus-read characters of the input text agrees with one of the determination number-of-characters values that are controlled by means of determination number-of-characters table 144 (S11*b*).

When it is determined that the number of the characters of the input text agrees with one of the determination number-of-characters values (YES in S11*b*), CPU 102 refers to text control table 142, thereby calculating a similarity between the input text and (a part of) each of the registered texts (S12).

On the other hand, when it is determined that the number of the characters of the input text does not agree with one of the determination number-of-characters values (NO in S11*b*), CPU 102 increments size "N" of the input text by 1 (one) (S16). Then, the CPU reads text data (input text) with a size of newly-set "N," from memory 103 (S11).

That is, in the embodiment, only when the number of characters of the input text agrees with one of the determination number-of-characters values that are controlled by means of determination number-of-characters table 144, the CPU performs the determination (S13) of the similarity between the input text and each of the registered texts and performs the subsequent processes (S14 to S15). With this configuration, determination processes for unnecessary similarities are not performed, resulting in an increased processing speed.

Note that the idea (S11*b*) described in the embodiment is also applicable, in the same manner, to the process (the flowchart shown in FIG. 6) in the second embodiment. Such an idea is one that the calculation of the similarities between the input text and the registered texts is performed only when the input text is inputted with the number of characters of the text being equal to one of the determination number-of-characters values.

Other Exemplary Embodiments

As described above, the first to third embodiments have been described to exemplify the technology disclosed in the present application. However, the technology according to the present disclosure is not limited to these embodiments, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first to third embodiments described above. Hence, other exemplary embodiments will be described hereinafter.

In the determination steps (S13 and S13*b*) in the embodiments described above, when it is determined that there exists a plurality of registered texts each of which exhibits a similarity not smaller than the threshold value, registered texts each exhibiting a similarity not larger than a predetermined value may be excluded from objects to be processed in the subsequent processes. With this configuration, the number of registered texts included in the objects to be processed is reduced, resulting in a reduced processing load and an increased processing speed.

In the embodiments described above, the descriptions have been made using the case where the translation process is performed from Japanese into English; however, the source and target languages are not limited these languages. The idea according to the present disclosure is also applicable to conversion processes for any language.

In the embodiments described above, the descriptions have been made using the case where the translation process is performed from one language (Japanese) into another language (English); however, the number of the target languages is not limited to one. That is, the translation may be performed from one language (e.g. Japanese) into a plurality of other languages (e.g. English, German, French, and Chinese) simultaneously. To this end, in the text control table shown in FIG. 4, there may be included translated texts in the plurality of the languages (e.g. English, German, French, and Chinese) corresponding to the registered texts. Then, by referring to the text control table for controlling the translated texts in the multiple languages, translated texts in the multiple languages (e.g. English, German, French, and Chinese) may be selected, with each of the selected translated texts corresponding to one registered text that has been identified based on the input text.

In the embodiments described above, the descriptions have been made using the case where the criterion for the determination in Step S13 is such that "whether there exists, in the list, only one registered text that shows the similarity being not smaller than a threshold value." However, the criterion for the determination is not limited to this. Instead of or, alternatively, in addition to this criterion for the determination, another criterion, that is, "differences in similarity from the other texts are not smaller than a predetermined value" may be adopted. For example, a case is described where the first five characters of each of the texts are identical among the texts and the sixth and subsequent characters of each of the texts are different among the texts. In this case, the sameness between texts to be compared is determined, not based on the sixth character (because of still-smaller differences in similarity among the texts), but based on a text consisting of further more characters (e.g. 8 to 10 characters or so, which causes the differences in similarity to become large among the texts). This allows an improvement in accuracy of the sameness between the texts being compared.

In the embodiments described above, the descriptions have been made using the case of the system that translates announcements made in the cabin of an aircraft; however, the control of the conversion process according to the present disclosure is not limited to such an in-flight announcement system in the aircraft cabin. The control of the conversion process according to the present disclosure is applicable to various announcement systems which are used in situations where contents of announcements have been determined in advance. Such announcements are presented at various locations including: facilities such as shops, stations, and airports; and transportation-facilities such as railways, ships, and buses.

Moreover, in the embodiments described above, the descriptions have been made using the case of the translation process in which fixed-form sentences inputted by a speech are translated into another language; however, the idea according to the present disclosure is not limited to the translation process applications. The idea is also applicable to other applications in which fixed-form speech information that is inputted is converted into another piece of information. For example, text control table 142 shown in FIG. 4 may store pieces of third information corresponding to the registered texts, instead of the translated texts. Such pieces of the third information are not limited to texts (character strings); they may be ones including video data and speech data. With this configuration, even during the utterance of a fixed-form sentence, it is possible to identify the registered text corresponding to the contents of the sentence being uttered, followed by determining the third information which corresponds to the thus-identified registered text. This makes it possible to quickly present the third information corresponding to the contents of the sentence being uttered, even during the utterance. That is, the present disclosure is intended to disclose the speech-information conversion apparatus as described below which converts an inputted speech into another piece of information.

The speech-information conversion apparatus is one that converts a fixed-form sentence inputted by a speech into another piece of information. The speech-information conversion apparatus includes: a storage unit, an audio input unit, a speech recognition unit, a conversion processing unit, and an output unit. The storage unit stores first information which indicates contents of predetermined sentences, and second information which indicates the contents of the predetermined sentences in a mode different from that of the first information. The audio input unit receives speech information which indicates the fixed-form sentence. The speech recognition unit generates text information based on the speech information. Before the audio input unit finishes receiving the speech information indicating the whole of the fixed-form sentence, the conversion processing unit identifies the first information corresponding to the fixed-form sentence, based on both the text information and a part of the first information. The output unit outputs the second information corresponding to the thus-identified first information.

In the embodiments described above, the functions of server 100 and seat monitors 200 are achieved through cooperation between the hardware (CPU) and the software; however, they may be achieved only with hardware circuits designed for the exclusive use. That is, instead of CPUs 102 and 202, other devices may be employed, including: a microprocessor unit (MPU), digital signal processor (DSP), field-programmable gate array (FPGA), and application-specific integrated circuit (ASIC).

As described above, the exemplary embodiments have been described to exemplify the technology according to the present disclosure. To that end, the accompanying drawings and the detailed descriptions have been provided.

Therefore, the constituent elements described in the accompanying drawings and the detailed descriptions may include not only essential elements for solving the problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions.

Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

INDUSTRIAL APPLICABILITY

With the idea disclosed in the present disclosure, in situations where the contents of utterances have been determined in advance, information corresponding to the contents being uttered can be output quickly. Therefore, the idea disclosed in the present disclosure is useful for a wide range of apparatuses that output information corresponding to the contents of utterances in situations where the contents of the utterances have been determined in advance. Such apparatuses include an announcement system which translates in-flight announcements and outputs them in the cabin of an aircraft, for example.

What is claimed is:

1. An announcement system for converting an announcement uttered in a first language into a second language, the system comprising:
    a sound pickup apparatus configured to receive a speech in the first language expressing a fixed-form sentence;
    a conversion apparatus configured to generate a translation of the fixed-form sentence based on the speech received by the sound pickup apparatus, the conversion apparatus including:
        a storage unit configured to store first information entries and corresponding second information entries, each first information entry indicating a content of a predetermined sentence in the first language, and each corresponding second information entry indicating the content of the respective predetermined sentence in the second language;
        an audio input unit configured to receive, from the sound pickup apparatus, speech information indicating part of the fixed-form sentence in the first language;
        a speech recognition unit configured to generate text information of the part of the fixed-form sentence in the first language based on the speech information;
        a conversion processing unit configured to identify a first information entry that corresponds to the fixed-form sentence, based on both the text information of the part of the fixed form sentence in the first language and a part of the first information entry that corresponds to the fixed-form sentence, before the sound pickup apparatus finishes receiving the speech expressing a whole of the fixed-form sentence; and
        a transmission unit configured to transmit the second information entry that corresponds to the identified first information entry; and
    an output apparatus configured to receive the second information transmitted from the transmission unit of the conversion apparatus, and present the received second information as information indicative of the translation by at least either a video or a speech.

2. The announcement system according to claim 1, wherein the conversion processing unit identifies the first information that corresponds to the fixed-form sentence based on a similarity between the text information generated by the speech recognition unit and the part of the first information.

3. The announcement system according to claim 1,
    wherein the storage unit stores a plurality of combinations between pieces of the first information and pieces of the second information;
    the storage unit further stores control information for controlling a number of characters necessary for identifying each of the pieces of the first information; and
    the conversion processing unit identifies one of the pieces of the first information, by using the text information containing characters equal in number to the number of the characters controlled by the control information, the one piece corresponding to the fixed-form sentence.

4. The announcement system according to claim 1, wherein the announcement system is an announcement system to be used in an aircraft.

5. A speech-information conversion apparatus for converting a fixed-form sentence inputted by a speech in a first mode into another piece of information in a second mode, the apparatus comprising:
- a storage unit configured to store first information entries and corresponding second information entries, each first information entry indicating a content of a predetermined sentence in the first mode, and each corresponding second information entry indicating the content of the respective predetermined sentence in the second mode;
- an audio input unit configured to receive, speech information indicating part of the fixed-form sentence in the first mode;
- a speech recognition unit configured to generate text information of the part of the fixed-form sentence in the first mode based on the speech information;
- a conversion processing unit configured to identify a first information entry that corresponds to the fixed-form sentence, based on both the text information of the part of the fixed form sentence in the first mode and a part of the first information entry that corresponds to the fixed-form sentence, before completion of receiving the speech information indicating a whole of the fixed-form sentence; and
- an output unit configured to output the second information in the second mode corresponding to the identified first information.

6. The speech-information conversion apparatus according to claim 5,
wherein the first mode is a first language, and
the second mode is a second language different from the first language.

* * * * *